United States Patent [19]

Willan

[11] Patent Number: 4,976,136

[45] Date of Patent: Dec. 11, 1990

[54] METHOD OF TESTING FOR FUSELAGE CRACKS

[76] Inventor: W. Craig Willan, P.O. Box 574, Hurst, Tex. 76053

[21] Appl. No.: 421,402

[22] Filed: Oct. 13, 1989

[51] Int. Cl.$^5$ .............................................. G01M 3/20
[52] U.S. Cl. .................................................... 73/40.7
[58] Field of Search ........................... 73/40.7; 340/604

[56] References Cited

U.S. PATENT DOCUMENTS

| 3,036,457 | 5/1962 | Wood et al. | 73/40.7 X |
| 3,949,596 | 4/1976 | Hawk | 73/40.7 |

FOREIGN PATENT DOCUMENTS

| 2827537 | 1/1980 | Fed. Rep. of Germany | 73/40.7 |
| 194380 | 5/1967 | U.S.S.R. | 73/40.7 |

OTHER PUBLICATIONS

*USAF Solves Fuel System Leak Detection Problem on SAC Bombers*, in Beckman Instr., Inc., Jul. 1964, pp. 17-18.

Primary Examiner—Hezron E. Williams
Assistant Examiner—Joseph W. Roskos
Attorney, Agent, or Firm—James E. Bradley

[57] ABSTRACT

A method of detecting cracks and structural separations in the fuselage of an aircraft utilizes a highly detectable gas such as chlorofluorocarbon. The gas will be pumped into the interior of the fuselage until the fuselage reaches a pressure that occurs during normal flight operations. A detector will then be moved over the skin of the fuselage. The detector is of a type that will detect minute amounts of any gas escaping through cracks and structural separations in the fuselage. The detector has an entrapment shoe which entraps any gas that might be bleeding off through a tiny crack. The detector has an alarm circuit which provides an alarm to the operator.

10 Claims, 4 Drawing Sheets

METHOD OF TESTING FOR FUSELAGE CRACKS

FIELD OF THE INVENTION

This invention relates to a method and device for testing the structural soundness and airworthiness of pressurized aircraft fuselage structures.

DISCUSSION OF PRIOR ART

The commercial airline industry has experienced tremendous growth since World War II. The growth has been based upon passenger requirements for comfort, safety and speed of travel. The primary contribution for passenger comfort has been aircraft cabin pressurization which allows near sea-level air pressure breathing environments while traveling at altitudes approaching 40,000 feet. This high altitude flight capability also creates additional passenger comfort by flying above the majority of weather disturbances.

Aircraft cabin pressurization, as a concept, has not been an easy task to accomplish. Pre WW II aircraft did not employ cabin pressurization. Shortly after WW II, the first commercial jet transport with cabin pressurization was introduced. Unfortunately, the first pressurized jet transports had three mid-air disasters in the early 1950's due to explosive cabin depressurization caused by cyclic fatigue from cabin pressurization cycles. The present day science of aircraft fatigue analysis and fracture mechanics was born from these disasters. Recent airline disasters because of cyclic fatigue have focused world attention once again on the safety aspects of pressurized aircraft cabin structures.

Although the absolute pressure involved, around 5-10 psi, may seem benign, the structural deflections or expansion of pressurized fuselage cabins can involve several inches, and with these deflections fatigue cracking usually develops. On the first pressurized transport, these cracks grew from the corners of the square cabin windows. In recent accidents, fatigue cracking has progressed catastrophically from pressure bulkheads, fuselage skin lap joints and cargo compartment door areas. All of these failures have been attributed to long term fatigue damage caused by cabin pressurizing cycles, possibly assisted by corrosion of the aluminum alloy structures.

It is clearly evident that the major commercial transport manufacturers did not intend, or design for, their aircraft to be subjected to infinite service life. However, the changing face of the commercial airline industry has resulted in airlines utilizing aircraft exceeding 30 years in age and nearing 100,000 flight cycles (one cycle is one take off and landing event). These two conditions of calendar age plus flight cycles feed upon each other, i.e. calendar age manifests itself as corrosion of the structure which then allows further accelerated progression of fatigue cracking induced by flight cycles.

Existing inspection techniques, concepts and philosophies are clearly not sufficient. Lack of knowledge of fatigue damage, unknowns involved with fatigue analysis, unrealistic "fatigue" testing, inattention to detail during inspections and simply missed or deferred inspections spell disaster.

Fatigue cracks by nature can be extremely small in size, on the order of 0.00001 to 0.001" in width and of various lengths depending on the number of cycles. In comparison, the fuselage surface area in need of inspection for a current narrow body transport is on the order of 6,000-9,000 square feet. Wide body transports have fuselage surface areas approaching 15,000 square feet.

Another fuselage problem that would affect the airworthiness results from lap joint debonds or structural separations. In these cases, the skin separates from the stringers and frame members of the fuselage.

One current technology inspection method relies on the human eye in conjunction with contrast enhancement methods such as dye or fluorescent penetrant to detect these small cracks. This technique, although widely used during aircraft manufacturing for small parts, relies heavily on human ability. Ambient lighting conditions and environmental effects (corrosion, grease, grime, etc.) can effect the inspection. An inspector's physical limitations such as eye vision corrections, mental attitude, concentration and judgment, and time schedule limitations also effect the probability of finding small fatigue cracks by this method.

Radiography is another current method. This method is time consuming and involves radiation hazards to personnel. Also, it possesses no enlargement or enhancement capabilities and cannot readily find edge view cracks.

Eddy current/ultrasonic methods are also currently employed. These techniques are time consuming and can be very sensitive to human technique, contact surface impedance, and backup structure.

As is clearly evident, the human factor has failed in preventing fatigue induced fuselage failures. The proverbial "needle in a haystack" applies when searching for a crack quite possibly the size of a needle in an area one-sixth to one half the size of a football field.

What is needed is an inspection technology possession the following characteristics:

1. Non destructive in nature;
2. Fast, no more than 5 to 10 hours for a complete fuselage inspection;
3. De-emphasis of the human factor and technique; and
4. Utilization of concepts and technology to reverse the heavy bias for missing a crack to a strong bias for finding a crack.

SUMMARY OF THE INVENTION

In this invention, the aircraft fuselage is tested for cracks by pressurizing the fuselage with a highly detectable gas. The gas is preferably a chlorofluorocarbon compound, such as Freon 22. This gas is pumped into the aircraft until it reaches at least its normal pressurized operating level. The pressure will then be maintained while one or more operators pass detectors over the exterior of the fuselage.

Each detector is a portable device that has a shoe with a skirt configured to fit closely on the exterior of the fuselage. The detector has sensors within it which will sense minute presence of the detectable gas. The sensors are connected to an alarm circuit to sound an alarm if any of the gas is detected. If the alarm sounds as the operator moves the detector along the surface of the aircraft, additional inspection will be made to determine the cause of the leak.

DETAILED DESCRIPTION OF THE INVENTION

Figure 1:
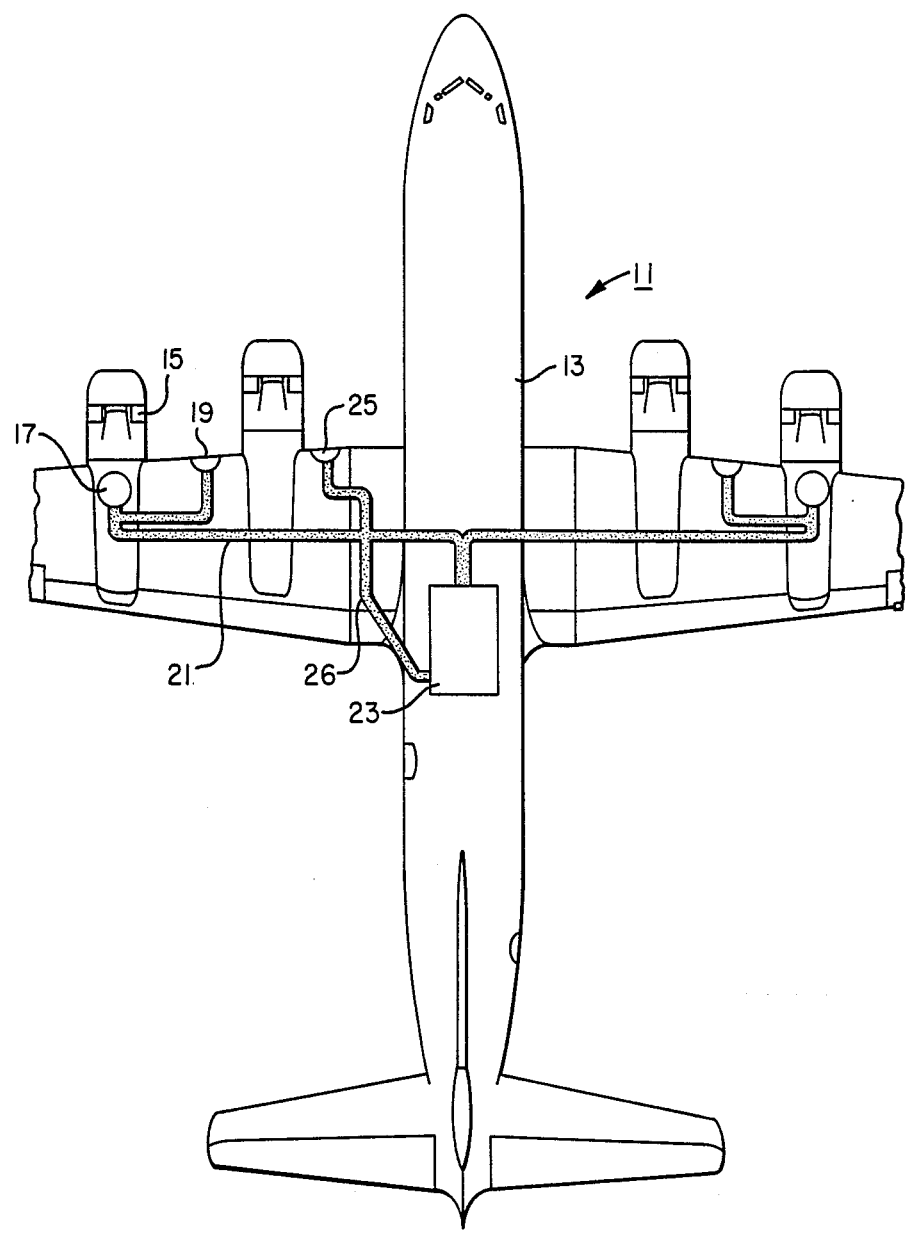
FIG. 1 is a schematic view of a portion of an aircraft illustrating portions of its cabin pressurization system.

Referring to FIG. 1, aircraft 11 is of a transport type for transporting passengers. It will have a fuselage 13 and a plurality of engines 15. Aircraft 11 has a cabin pressurization system. This includes compressors 17 which are a part of the engines 15. The compressors 17 are connected to intakes 19. Compressors 17 deliver pressurized air through lines 21 to an air conditioning system 23. The air conditioning system 23 distributes the pressurized air throughout ducts in the fuselage 13. An entry port 25 delivers fresh air to the air conditioning system 23 through line 26 for heating.

The cabin pressurization system has controlling means which will control the pressure in the cabin to be about 5 to 10 pounds per square inch above atmospheric pressure once the aircraft is airborne. The pressure will increase with altitude to a maximum level. This pressurization system utilizes the compressors 17.

Figure 2:
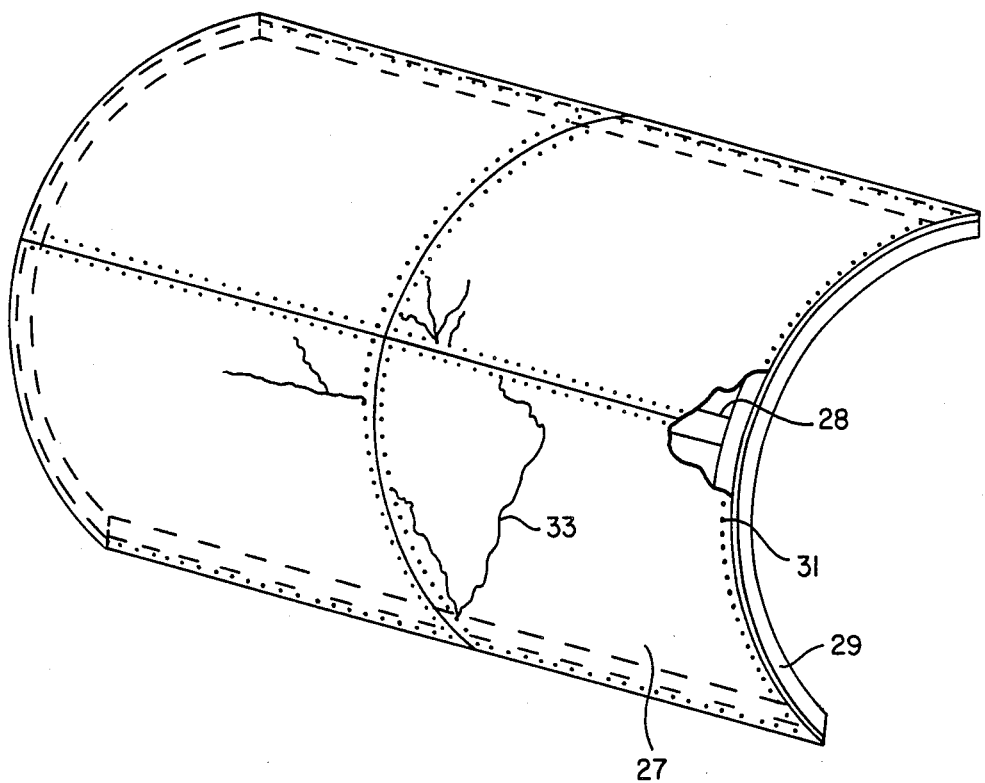
FIG. 2 is a perspective view illustrating a portion of the fuselage of the aircraft of FIG. 1.

This cabin pressure will cause the fuselage to swell and expand outward. As shown in FIG. 2, the fuselage is made up of a skin 27 secured to a gridwork of longitudinal stringers 28 and circumferential frame members 29. The skin 27 is lightweight sheet metal while the stringers 28 and frame members 29 are beams made of aluminum. Rivets 31, screws or the like will be used to fasten the individual sheets of skin 27 to the stringers 28 and frame members 29.

The application of cabin pressure will cause the skin 27, stringers 28 and frame members 29 to bulge out slightly. The bulging is elastic, and when the pressure is removed, the skin 27, stringers 28 and frame members 29 will return to their normal shape. The cycling causes fatigue and eventually may cause cracks 33. The cracks 33 are normally of such small size that routine pressurization of the aircraft fuselage 13 will not result in any crack detection. There will not be any instrument indication of pressure loss by the aircraft instruments because of these tiny cracks. The cracks may be in the order of 0.00001 to 0.001 inches in width and various lengths.

For testing of the cracks 33, a highly detectable gas will be pumped into the fuselage 13 until a pressure is reached. Preferably this is handled by connecting the detectable gas source to one of the intakes 19 (FIG. 1), then utilizing one of the compressors 17 to apply the pressure. As an alternate to introducing the detectable gas through the intake 19 by centrifugal compressors 17, the gas could be pumped into the fuselage 13 through a small induction port (not shown) located centrally on the upper or lower fuselage skin 27.

The gas is preferably a halogen based chlorofluorocarbon compound (CFC) or a gas from the noble group such as helium, argon or carbon dioxide. The most desirable of the detectable gasses is $CHClF_2$ (R-22), also called Freon 22. Very minute amounts of this gas can be detected by conventional detectors. Noble gases are not as easily detected, however will still serve the purpose. Helium and argon are the most readily available of the noble group as commercial gases and can be easily detected by conventional electronic detection devices. Approximately 100 times greater sensitivity is available with CFC gases than with helium or argon.

Figure 3:
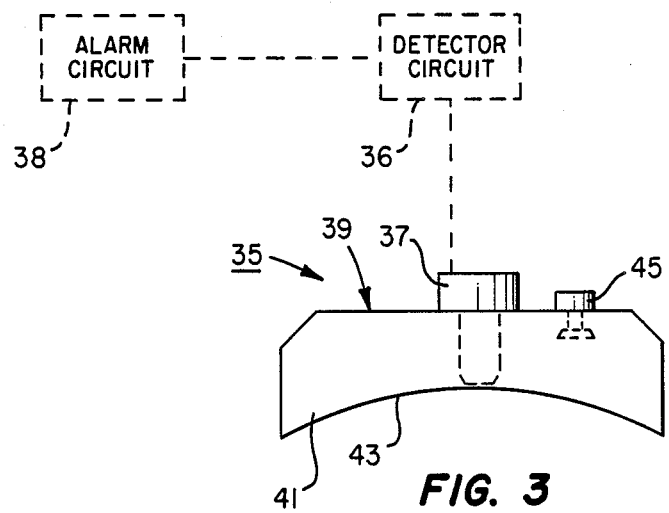
FIG. 3 is a side view of a detector shoe used in accordance with this invention.

The means for detecting any leakage through cracks 33 (FIG. 2) will be a detector 35, shown in FIG. 3. The detector 35 has a detector circuit 36 and a small hand held unit or shoe 39. Detector 35 has a pair of sensors 37 mounted to the shoe 39 and connected by wires 40 (FIG. 5) to the detector circuit 36. Sensors 37 are conventional sensors used to detect minute amounts of the detectable gas. For a CFC gas, the sensors 37 operate on the principle of a variation of current flow. The sensors 37 have two oppositely charged platinum electrodes. The electrodes cause ionization of decomposed CFC molecules between them. This causes a change in current which is detected by the detector circuit 36. The detector circuit 36 actuates an alarm circuit 38. The alarm circuit 38 will sound audible and/or visual warnings to the operator. Sensors 37 will detect a gas flow in quantities as small as 0.0000003 cubic inches per minute.

If helium, argon or carbon dioxide is used, the detector 35 will also be conventional. However, it would be a hot wire Pirani type bridge detector. This type of detector uses differences in the thermal conductivity of flowing gas to produce a signal. This type of detector would also detect CFC gas, but would be less sensitive.

Figure 4:
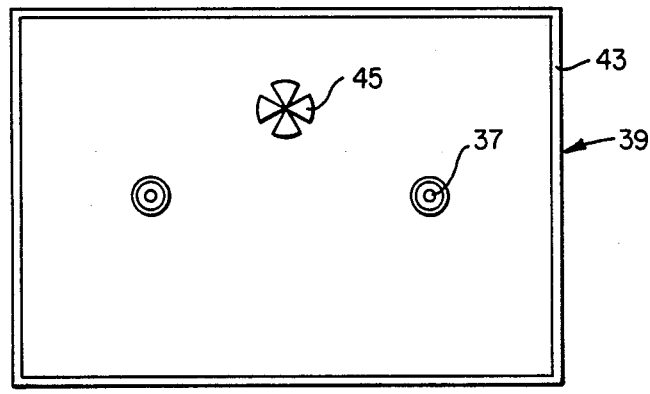
FIG. 4 is a bottom plan view of the detector shoe of FIG. 3.

Shoe 39 has a housing with a depending skirt 41. As shown in FIG. 4, the shoe 39 is generally rectangular. The lower edge 43 of skirt 41 is contoured on two sides to be the same as the general contour of the fuselage 13. The lower edge 43 may have a soft membrane to prevent surface marring of the skin 27 during the rapid sliding over the skin surface. The sensors 37 are releasably mounted in the shoe 39 so that they can be coupled to shoes 39 having different contours for different parts of the fuselage 13 and for different aircraft fuselages 13. Also, the detector 35 preferably has circulation means within the shoe 39 to avoid stagnation of the gas. This comprises a small fan 45.

In operation, to test the fuselage 13 for structural airworthiness, a detectable gas source will be connected to one of the intakes 19 of one of the compressors 17. All other ports or entries into the aircraft will be closed. Initially, the aircraft will be filled with air at atmospheric pressure, and it will not be evacuated to any lower level than atmospheric pressure. Compressor 17 is operated to pump the detectable gas into the interior of the fuselage 13 until reaching the desired test level. Preferably, the detectable gas is not diluted with any other gas as it is pumped into the aircraft.

The pressure should be sufficient to cause some outward swelling or deflection of the skin 27, stringers 28 and frame members 29. The pressure should be in the range from 2-14 psi and will normally be at least that of the normal pressurization that occurs during normal flight operations, which is 5-10 psi. If desired, some of the air within the fuselage 13 can be purged as the detectable gas is introduced. However, this is not necessary. Standard cabin outflow valving will be monitored during the pressurization so that minimal detectable gas escapes through any pop-off venting devices.

Figure 5:
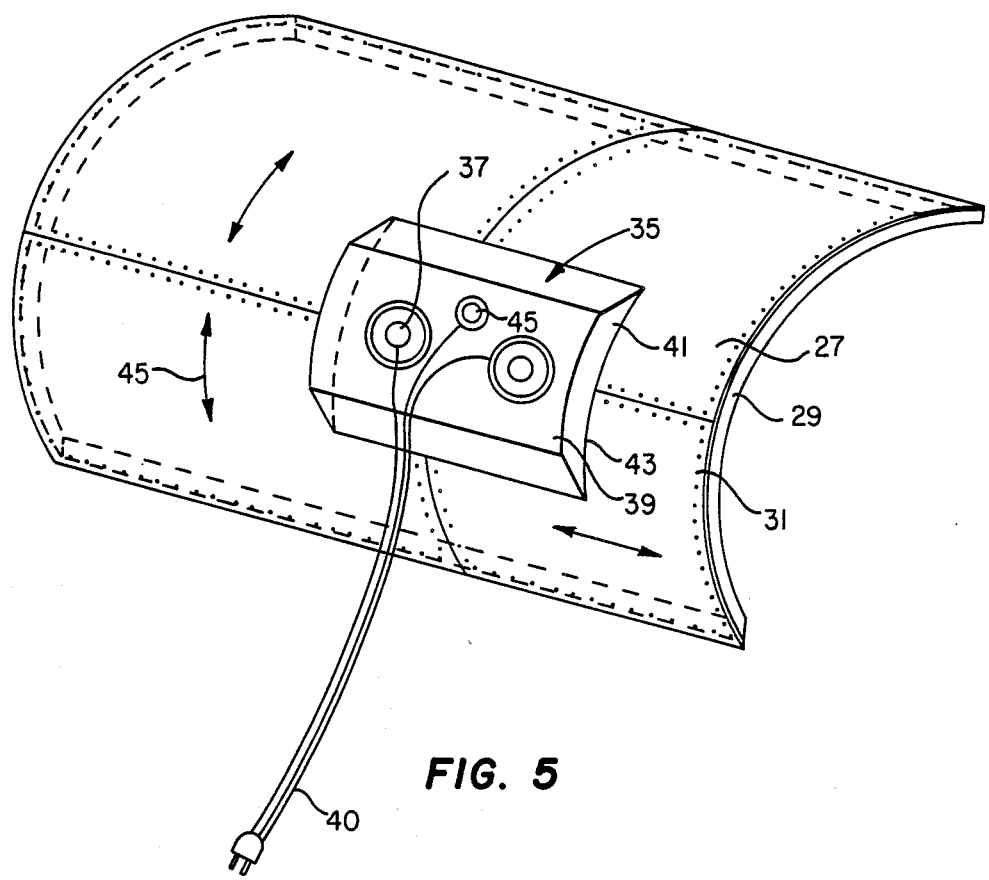
FIG. 5 is a perspective view of a portion of the fuselage of the aircraft of FIG. 1, and showing the detector shoe in place.

An operator will then place the shoe 39 of detector 35 on the exterior of fuselage 13, as shown in FIG. 5. He will move the detector shoe 39 along the fuselage 13 as indicated by the arrows 45 until covering all of the surface of the aircraft fuselage 13. Any minute quantity of detectable gas leaking through the fuselage 13 will be entrapped within the shoe 39, sensed by the sensors 37 and detected by the detector circuit 36. The alarm circuit 38 will sound a warning horn and cause a light to flash.

Gas detection in itself does not necessarily mean a crack is present. Passenger and cargo compartment doors, for example, can be expected to naturally leak some amount of interior detectable gas, depending on door seal condition. A further detailed inspection of these areas would be warranted if gas detection occurs. Outer surface irregularities such as antenna, wing root fillets and the like may require a more localized detection sequence. A smaller shoe 39 with different geometry may be required.

Once the testing has been completed, the detectable gas can be recycled, or decomposed by rapid pumping of gas from the fuselage 13. This will restore the interior fuselage atmosphere back to normal air.

The invention has significant advantages. From fluid mechanics calculations and real world simulations, it is possible to perform this structural inspection technique with the statistical odds for detecting a crack or structural separation of 10.8 million to one. The invention is non destructive in nature. The system simulates actual conditions of flight pressurization. It can be utilized by aircraft maintenance personnel without extensive training. It is relative fast in comparison to existing inspection techniques. It de-emphasizes the human factor in inspection. Because the fuselage is pressurized, any existing cracks are enlarged, making it more likely to determine defects that would not exist at atmospheric pressure. No structural disassembly of the aircraft is required in order to accomplish the test. The test not only tests for cracks, but also detects structural debonding or separation, which can accelerate lap joint corrosion and corrosion fatigue. This inspection system is relatively inexpensive, thus it can be performed during normal aircraft maintenance. Cracks can be caught at a very early stage before they can grow catastrophically. Rather than having detailed inspections every 2-5 years, as currently exist, these inspections can be performed on a monthly basis.

While the invention has been shown in only one of its forms, it should be apparent that those skilled in the art that it is not so limited, but is susceptible to various changes without departing from the scope of the invention.

I claim:

1. A method of detecting cracks and structural separations in a fuselage of an aircraft, comprising:
   introducing a highly detectable gas into the interior of the fuselage;
   pressurizing the interior of the fuselage to a pressure above atmospheric pressure with the gas contained therein to an amount sufficient to cause slight swelling of the fuselage; then
   passing a detector over the exterior of the fuselage of a type which will detect minute amounts of the gas which might pass through any cracks and structural separations in the fuselage; and
   indicating to an operator the presence of any of the gas detected.

2. The method according to claim 1 wherein the fuselage is pressurized to at least two psi over atmospheric pressure.

3. The method according to claim 1 wherein the gas is a chlorofluorocarbon.

4. The method according to claim 1 wherein the gas is a noble gas.

5. The method according to claim 1 wherein the gas is carbon dioxide.

6. A method of detecting cracks and structural separations in a fuselage of an aircraft of a type which has a cabin pressurization system, comprising:
   pumping a highly detectable gas into the interior of the fuselage until a pressure is reached that is greater than atmospheric pressure;
   providing a detector with a shoe having a skirt, and placing the skirt in contact with the fuselage to define a chamber within the skirt for trapping any of the gas leaked from the interior of the fuselage;
   circulating air and any of the detectable gas located within the skirt;
   passing the detector over the exterior of the fuselage, the detector being of a type which will detect minute amounts of the gas which might pass through any cracks and structural separations in the fuselage; and
   indicating to an operator the presence of any of the gas detected.

7. The method according to claim 6 wherein the gas is a chlorofluorocarbon.

8. The method according to claim 6 wherein the gas is a noble gas.

9. The method according to claim 6 wherein the gas is carbon dioxide.

10. An apparatus for testing an aircraft fuselage for cracks and structural separations, comprising in combination:
    means for pumping a highly detectable gas into the fuselage to a selected pressure greater than atmosphere;
    a detector having a shoe with a skirt for placement against the exterior of the fuselage, the skirt being movable along the exterior of the fuselage;
    circulation means within the skirt for circulating air located within the skirt; and
    means in the detector in communication with the interior of the skirt for detecting if minute amounts of the gas are present, and for providing an indication if any of the gas is detected.

* * * * *